Aug. 16, 1949.　　　T. C. PATTEN　　　2,479,399
AUTOMATIC FISHING FLOAT
Filed March 7, 1946

Inventor
TOM C. PATTEN.

By
E. V. Hardway
Attorney

Patented Aug. 16, 1949

2,479,399

UNITED STATES PATENT OFFICE 2,479,399

AUTOMATIC FISHING FLOAT

Tom C. Patten, Houston, Tex.

Application March 7, 1946, Serial No. 652,701

1 Claim. (Cl. 43—15)

This invention relates to an automatic fishing float.

An object of the invention is to provide, in fishing equipment, means for automatically imparting a jerk to the fish hook immediately upon the taking of the bait by the fish.

It is another object of the invention to provide a fishing cork of the character described wherein the operating mechanism is enclosed, concealed, and protected.

With the above and other objects in view, the invention has a particular relation to certain novel features of construction, operation and arrangement of parts, an example of which is given in this specification and illustrated in the accompanying drawings, wherein.

Figures 1, 2, 3:
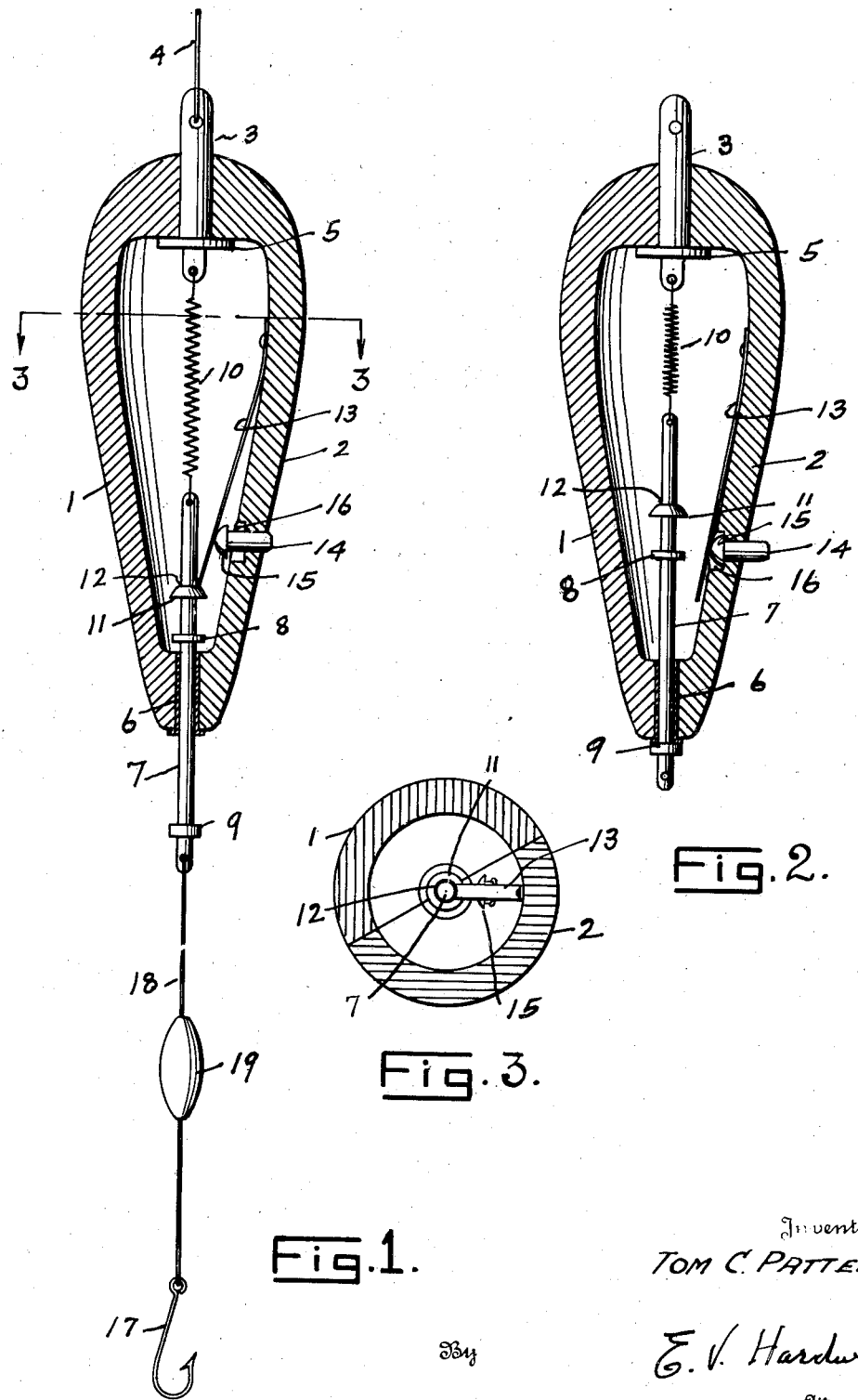
Figure 1 is a longitudinal, sectional view of the cork showing the mechanism set for operation.
Figure 2 is a longitudinal, sectional view showing the mechanism tripped.
Figure 3 is a cross-sectional view taken on the line 3—3 of Figure 1.

Referring now more particularly to the drawings wherein like numerals of reference designate the same parts in each of the figures, the numerals 1, 2 designate the respective sections of the cork, or float, which may be assembled together into a complete cork, or float, as shown in Figures 1 and 2, and when so assembled, abutting parts may be glued together by a suitable waterproof glue or secured together in any other selected manner.

The cork, or float, is of the usual outside contour but is hollow.

Fitted axially through the upper end of the cork, or float, is the line anchor 3, to which the usual fishing line 4 may be connected. The lower end of the anchor is formed with disc-like abutment 5 to prevent its detachment.

The lower or smaller end of the cork, or float, has a tubular sleeve 6, preferably of brass fitted axially therethrough, forming a bearing. Working through this bearing, there is a stem 7, which is preferably formed of copper and which has the spaced stop 8 and 9 thereon to limit its range of movement.

The inner end of the stem 7 is connected to the line anchor 3 by means of a pull spring 10.

On the stem 7 and spaced above the stop 8 there is an annular frusto-conical shaped catch 11, whose upper end is slightly wider than the stem 7, thus providing a narrow annular shoulder 12.

There is a flat spring 13 which forms a latch and whose upper end is secured to the inner side of the cork, or float, and whose lower end is free. It normally rests against the inner side of the cork.

There is a push rod 14 which works through a bearing in the side of the cork opposite said latch and whose inner end is formed with an enlarged head 15, adapted to rest in a counter-sunk seat 16 on the inside of the cork. There is a hook 17 suspended from the lower end of the stem 7 by the line 18 which carries a sinker 19.

In order to set the mechanism of the cork for operation, the stem 7 is pulled downwardly, or outwardly, until the catch 11 passes the free end of the latch 13 and the push rod 14 is forced inwardly to move the free end of the latch against the stem 7, where it is held while the stem 7 is released so that the shoulder 12 will move into engagement with the free end of the latch. The pull of the spring 10 will hold said shoulder against said free end and will maintain the latch in engaging position.

When the fish takes the bait, the stem 7 will be pulled slightly downwardly, thus releasing the free end of the latch and said latch will move outwardly into the position shown in Figure 2 and the spring 10 will impart a sudden jerk to the hook causing it to impale the fish.

The anchor 3 is preferably formed of aluminum and the bearing 6 and stem 7 are preferably formed of brass. The push rod 14 is also preferably of aluminum and the spring 10 and latch 13 are preferably of steel. The body of the cork, or float, is preferably formed of cork or balsa wood, although the parts of the equipment may be formed of any other suitable materials.

The drawings and description are illustrative merely while the broad principle of the invention will be defined by the appended claim.

What I claim is:

A fishing cork, or float, comprising, a buoyant hollow body having a bearing in the side thereof, an anchor for attaching a fishing line to one end thereof, a stem slidable axially through the other end of the body and forming a connection for a hook and line, spaced stops on the stem engageable with the body for limiting the longitudinal movement of the stem, a frusto-conical shaped catch on the stem whose upper end is only slightly wider than the diameter of the stem providing a narrow annular shoulder, a flat spring forming a latch whose upper end is secured to the inner side of the body and whose lower end is free and normally rests against the inner side of the body, a push rod working through said bearing in the side of the body opposite the latch and whose inner end is formed with an enlarged head which engages against said latch, and a pull spring connected at one end to the line anchor and whose other end is connected to the inner end of the stem, said stem being movable outwardly to place said pull spring under tension and said push rod being movable inwardly to move the free end of said latch into engagement with said shoulder to maintain tension on the stem, said latch being releasable from the shoulder upon further outward movement of the stem to allow the pull spring to suddenly pull the stem inwardly to create a jerk on the hook.

TOM C. PATTEN.

REFERENCES CITED

The following references are of record in the file of this patent:

UNITED STATES PATENTS

| Number | Name | Date |
| --- | --- | --- |
| 686,647 | Booth | Nov. 12, 1901 |
| 711,318 | Hymers | Oct. 14, 1902 |
| 751,734 | Hymers | Feb. 9, 1904 |
| 1,012,899 | Nelson | Dec. 26, 1911 |
| 1,614,931 | Pennell | Jan. 18, 1927 |
| 1,989,407 | Ezell | Jan. 29, 1935 |

FOREIGN PATENTS

| Number | Country | Date |
| --- | --- | --- |
| 633,322 | France | Oct. 22, 1927 |